No. 872,094. PATENTED NOV. 26, 1907.
J. SZEKERES.
TROLLEY SECURING DEVICE.
APPLICATION FILED AUG. 23, 1907.
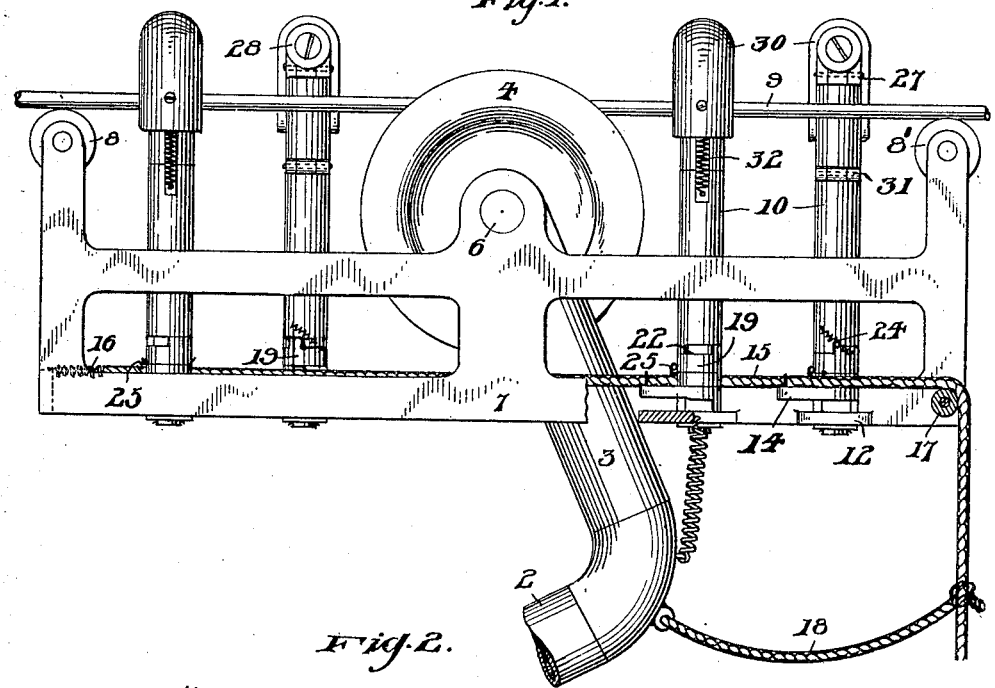
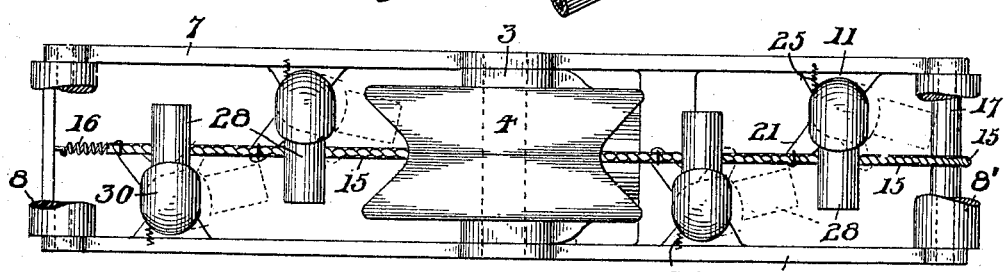
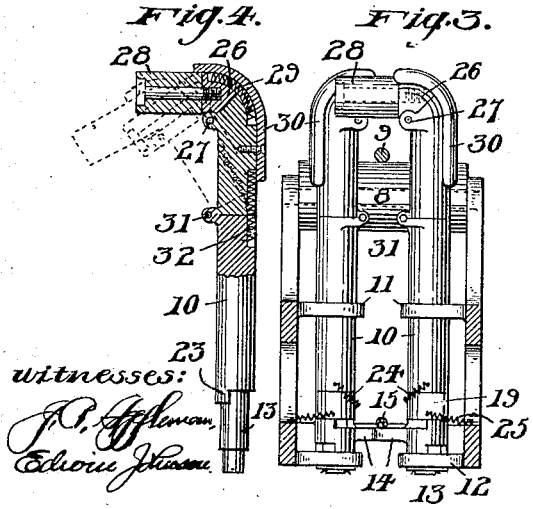
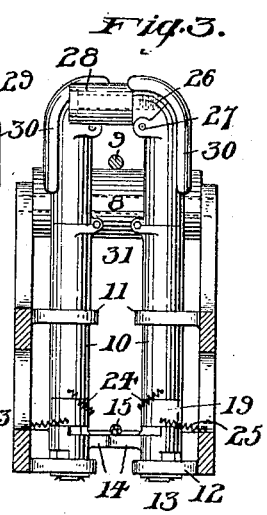
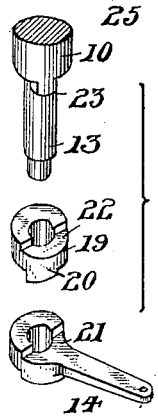

UNITED STATES PATENT OFFICE.

JOHN SZEKERES, OF PITTSBURG, PENNSYLVANIA, ASSIGNOR OF ONE-HALF TO JOHN POLUBA, OF ALLEGHENY, PENNSYLVANIA.

TROLLEY-SECURING DEVICE.

No. 872,094.     Specification of Letters Patent.     Patented Nov. 26, 1907.

Application filed August 23, 1907. Serial No. 389,837.

*To all whom it may concern:*

Be it known that I, JOHN SZEKERES, a resident of Pittsburg, in the county of Allegheny and State of Pennsylvania, have invented certain new and useful Improvements in Trolley-Securing Devices, of which the following is a specification.

The object of this invention is to provide improved means for preventing a trolley from accidentally disengaging the conductor, and the same consists primarily of a frame movable with the trolley wheel having arms mounted thereon which normally overhang the conductor and confine it in engagement with the wheel.

The invention also includes means for turning the arms out of conductor-confining position.

A further feature of the invention is the jointing of the arms, with springs for resisting movement at the joints, whereby the arms yield readily in several directions when placing the trolley upon the conductor, also when encountering obstructions without releasing the trolley.

In the accompanying drawings, Figure 1 is a side elevation, partly in section, of the improved trolley. Fig. 2 is a top plan view of the same also partly in section. Fig. 3 is an end elevation, portions of the mechanism being in section. Fig. 4 is a detail view of one of the cable-confining arms, and Fig. 5 is a similar view of portions of the same.

Referring to the drawings, 2 designates the upper end of the trolley pole, 3 the harp, and 4 the trolley wheel. 6 is the wheel journal which projects beyond the outer faces of the harp, and mounted to swing thereon is horizontal frame 7 which extends in front of the wheel and behind the same and carrying rollers 8 and 8' at its opposite upper ends which bear upwardly against the conductor or trolley wire 9.

For confining the conductor in the groove of the wheel, upright arms 10 are carried by the frame 7, located both in front of and behind the wheel. Each arm is revolubly mounted in the brackets 11 and 12 on the inner sides of frame 7. The lower portion 13 of each arm is of spindle form, and loose thereon is the crank-like extension 14, and all of these extensions are connected to cord 15 extending longitudinally through the lower portion of frame 7, with spring 16 connecting the forward end of the cord to the end of the frame, thereby holding all of extensions 14 in forwardly turned position, as in full lines in Fig. 2. Cord 15 extends downwardly over roller 17 in the rear end of frame 7 and connecting with the trolley-adjusting cord 18 which hangs at the rear of the car.

Loose on spindle 13 above extension 14 is sleeve 19, and projecting from the lower face of this sleeve is the clutch extension 20 which moves in a somewhat longer depression 21 in the top of extension 14, whereby sleeve 19 may have a limited turning movement independently of said extension. Arm 10 at the upper end of spindle 13 similarly interlocks with the upper recessed face 22 of sleeve 19, the clutch projection coöperating with said recess being indicated at 23. A coiled spring 24 connects arm 10 with sleeve 19, and a similar but oppositely acting spring 25 connects said sleeve with the frame 7. The effect of these springs is to hold arm 10 with its laterally extended upper portion normally projected over conductor 9, but with the arm ready to turn either forward or backward as may be required for disengaging the same from the conductor or for engaging the same therewith. When cord 15 is drawn downward against the pull of spring 16, all of arms 10 are turned into the positions indicated in dotted lines in Fig. 2, when the trolley may be lowered from the wire.

At the upper end of each of arms 10 is the laterally extended member 26 hinged at 27 and carrying horizontal roller 28 which normally overhangs the trolley wire, the roller preventing undue friction. Joint 26 is held normally in horizontally projected position by a spring 29, which spring permits joint 26 with its roller to turn downward so that the trolley wire may be readily engaged as when placing the trolley thereon. The hinged end of joint 26 works behind the curved shield or guide 30 fixed to arm 10 which renders the wire readily movable over the joint and into place when applying the trolley to the wire, and also protects the joint when obstructions are encountered and tends to deflect the same.

To obtain still further flexibility of the arm it is provided on its inner side and midway its ends with hinge 31, with spring 32 for normally resisting turning at this hinge.

This joint facilitates the placing of the trolley in operative engagement with the conductor. With a pair of arms in front of the trolley wheel and a pair at the rear thereof, one or more of the several arms may at the same time be momentarily deflected out of wire-confining position without the trolley becoming disengaged, the remaining arm or arms preventing such a happening.

I claim:—

1. The combination of a trolley wheel, a support movable therewith, upright arms revolubly mounted on the support, springs for resisting rotation of the arms, each arm having a laterally extending top portion adapted to overhang the trolley wire, each arm being formed of sections hinged together, and springs for resisting the turning of the sections on the hinges.

2. The combination of a trolley wheel, a support movable therewith, upright arms on the support, each arm having a laterally extending top portion hinged thereto so that it may turn downward, and a spring for resisting such downward movement.

3. The combination of a trolley wheel, a support movable therewith, upright arms rotatably mounted on the support, each arm having a hinged joint midway its ends and each arm provided at its upper end with a laterally extending downwardly swinging portion, and a spring for resisting such downward movement.

4. The combination of a trolley wheel, a support movable, therewith, upright arms carried by the support, each arm at its upper end having a laterally extended portion provided with a roller, and a shield on the outer side of the arm partially overhanging said laterally extended portion.

In testimony whereof I affix my signature in presence of two witnesses.

JOHN SZEKERES.

Witnesses:
    JULIUS ZAMBOLMOS,
    GEO. A. YOUNG.